United States Patent
Pichler et al.

[11] Patent Number: 5,505,776
[45] Date of Patent: Apr. 9, 1996

[54] COATING SYSTEM FOR COATING TRAVELING WEBS OF MATERIAL

[75] Inventors: Jörg Pichler, Steinheim; Martin Kustermann; Michael Trefz, both of Heidenheim, all of Germany

[73] Assignee: J. M. Voith GmbH, Heidenheim, Germany

[21] Appl. No.: 248,750

[22] Filed: May 25, 1994

[30] Foreign Application Priority Data

May 27, 1993 [DE] Germany .................. 43 17 657.7

[51] Int. Cl.$^6$ .................................................. B05C 1/08
[52] U.S. Cl. .................. 118/203; 118/227; 118/249; 118/255; 118/262; 427/428
[58] Field of Search .................. 118/262, 203, 118/227, 249, 255; 427/428

[56] References Cited

U.S. PATENT DOCUMENTS 2,605,684  8/1952  Nagels et al. .................. 118/262
3,684,561  8/1972  Labombarde .................. 427/428
4,963,081  10/1990 Yokoya .......................... 425/115
5,103,759  4/1992  Henseler et al. ............... 118/262
5,122,396  6/1992  Rantanen ....................... 427/359
5,179,909  1/1993  Sollinger ....................... 118/119
5,351,399  10/1994 Neuhöffer et al. ............ 29/895.3

FOREIGN PATENT DOCUMENTS 0362174  4/1990  European Pat. Off. .

Primary Examiner—Shrive Beck
Assistant Examiner—Katherine A. Bareford
Attorney, Agent, or Firm—Baker & Daniels

[57] ABSTRACT

The invention concerns a coating system with at least one web support roll and at least one corresponding metering roll coordinated with it and having a grooved surface essentially in peripheral direction or in the form of a threading, for metering the coating substance in the gap existing between the web support roll and the metering rolls. A groove forming or groove truing system can be infed in the operation of the coating system can be infed onto the metering rolls.

9 Claims, 1 Drawing Sheet

COATING SYSTEM FOR COATING TRAVELING WEBS OF MATERIAL

BACKGROUND OF THE INVENTION

The invention concerns a coating system for the coating of traveling webs of material, notably of paper or cardboard. Meant by a coating system is a kind of system featuring rolls of which at least one is a web support roll while another is a metering roll and effects a coating or impregnation of a traveling paper web with a coating mixture or other coating or impregnating substance.

EP 0 362 174 A describes a system in which the metering roll has a cylindrical core and, wound on it in the form of a threading, a wire with a small diameter, which is stated, e.g., to be 0.3 mm. According to the references in this document, the cylindrical core diameter may be about 300 mm. Small rolls of reduced diameter and of such structure have so far been used frequently and called grooved roll doctors. The diameter of these so-called roll doctors ranged generally between 10 and 20 mm. The disadvantage of all of these systems is the wear of the fine wire lashing of the substrate core, both with the grooved roll doctor and the metering roll provided with a wire lashing. Such wear occurs particularly in the case of pigmented coatings. As a result, the necessary constant rate of application flow is no longer given over the service life of the grooved metering roll or roll doctor. Namely, as the bulges of the wires or protuberances forming the grooves wear down, a reduction occurs of the passage cross section between metering roll and web support roll, which entails a steady reduction of the coating weight.

Another great disadvantage, however, is the occurrence of a considerable jump in coating weight as a worn metering system is replaced by a new one. This leads to quality fluctuations in the finished product, which in part can no longer be tolerated. Therefore, the problem underlying the invention is to reduce the wear of the metering roll or doctor.

SUMMARY OF THE INVENTION

The present invention involves a forming or re-forming of the metering roll grooves during operation, whereby the wear is compensated for. This measure is effected irrespective of the measurement of the momentarily achieved coating weight, preferably based on wet substance.

To that end it is necessary to no longer use wire-lashed metering rolls but integral metering rolls, the grooves of which are machined into their surface. The truing of the grooves can favorably be accomplished with a laser beam cutting system or with a groove or thread rolling system. To enable an accurate operation of such a system, cleaning systems are favorably allowed to act upon the metering roll surface, with the result that the groove-forming system works on a clean surface of the metering roll.

BRIEF DESCRIPTION OF THE DRAWINGS

The invention is illustrated hereafter with the aid of the embodiments shown in the drawing, which individually depicts in FIG. 1, a side elevational view of an embodiment of the system of the present invention.

DETAILED DESCRIPTION OF THE INVENTION

Figure 1:
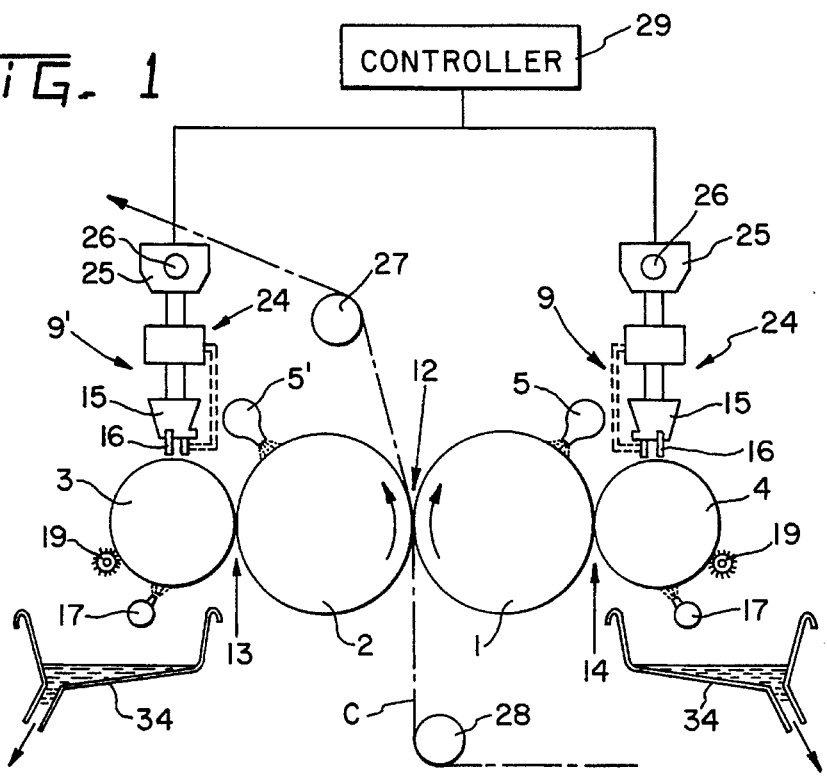

In FIG. 1 there are two web support rolls 1 and 2 with which metering rolls 3, 4 each, equipped with a grooved shell surface, are coordinated. The plurality of grooves is in a generally circumferential direction. The web C proceeds via reversing rolls 27 and 28 into the squeeze gap 12 forming between the two web support rolls 1 and 2. Together with the metering rolls 3, 4 the latter form respective metering gaps 13, 14. The application of the coating mixture on the shell of the web support rolls 1, 2 is effected by spray or pouring system 5, 5' featuring a rollwide metering gap. The groove-forming systems coordinated with the two metering rolls 3 and 4 are only indicated here. To clean the grooves of the metering rolls, a cleaning system 17 each is coordinated with them which, e.g., may employ spray jets and for which a collection trough 34 each is provided to receive the amount of coating mixture washed off. The cleaning may be amplified by an additional brush 19.

Figure 2:
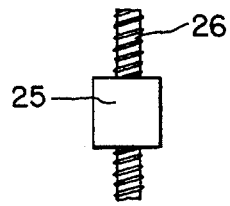
FIG. 2, a plan view of the groove-forming system.
Figure 4:
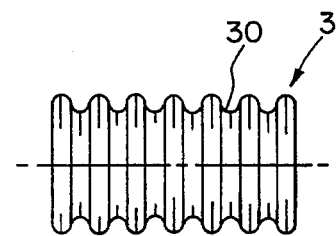
FIG. 4 is a fragmentary elevational view showing a grooved metering roll.

The groove-forming system 9, 9' features in this case a laser beam gun 16 supported by a holder 15 and a lead screw system 24 (FIG. 2) which, in turn, is being held by a transport head 25. The latter head runs on a lead screw 26 along the metering roll to thereby control the movement and position of the groove-forming system 9 in a direction substantially parallel to the longitudinal axis of each metering roll 3, 4. FIG. 4 illustrates metering roll 3 having grooves 30 extending in a generally circumferential direction. A pertaining controller 29 is shown in FIG. 1 and the motor is not illustrated. The lead screw makes it possible to reciprocate the groove-forming system along the rolls for groove touch-up during this motion, depending on how heavy a wear, or reduction of groove cross section, has already occurred. To obtain an accurate stock removal for an accurately controlled increase in groove depth, the lead screw unit is controlled dependent on a distance measuring system which measures the spacing of the laser beam gun or machining tool in general from the metering roll respectively its shell surface. The procedure may be such that a touch-ups between 2 and 20 µm is carried out, matching a specific wear that has occurred. The truing or re-forming tool, for instance the laser beam gun, may be so designed that 1 to 10 or more adjacent profile threads can be processed simultaneously.

Figure 3:
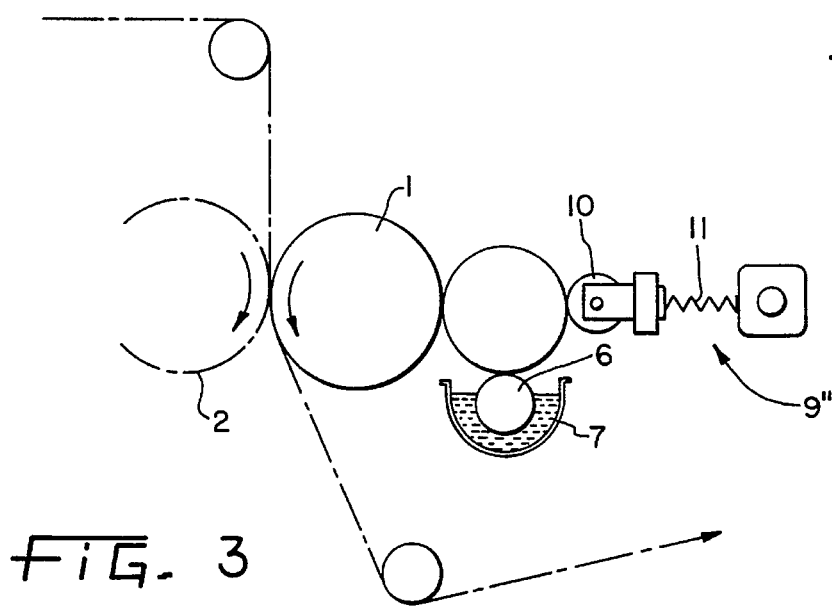
FIG. 3, a side elevational view of another embodiment of the present invention.

FIG. 3 shows a similar system, the direction of roll rotation and direction of web travel being opposite here to FIG. 1. Provided as applicator is here a dip roll 6 each which dips into the coating mixture contained in a tub 7. In this case, as indicated, the groove-forming system 9" employs a roller 10, so that the groove-forming system virtually represents a thread rolling system. Necessary here are means for obtaining a definitive contact force, which is indicated here by the spring 11. The thread rolling systems are preferably arranged exactly diametrically opposed and are moved along the rolls in synchronism.

As such, of course, there are now most varied variants of the coating system possible which, however, are known extensively from the prior art. It is possible, of course, to provide only a single web support roll and to effect the coating of the web by the so-called drag application, whereas with the systems presented so far a double-sided application is possible. Only one side may be coated, of course, while the other side is coated or impregnated with nonabrasive fluid, which makes the groove truing system superfluous on this metering roll. On the other hand, of course, groove forming systems still other than those described are possible.

In certain cases, lastly, it is also possible to perform a certain profiling of the metering rolls across their width when a varying infeed of the groove forming system is adjusted across the width of the rolls. The procedure could be such that for instance a hydraulic unit consisting of piston and cylinder could replace spring system 11 (FIG. 3) and be acted upon by an appropriately variable controlled pressure. In the other case, i.e., FIG. 1, the stroke of the lead screw system would be controlled appropriately.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A coating system for application of a coating mixture on a material web, comprising:

at least one web support roll;

at least one metering roll operatively associated with said web support roll and having an outer surface with a plurality of grooves extending in a generally circumferential direction, said web support roll and said metering roll defining a metering gap therebetween, said metering roll defining a means for metering the coating mixture into said metering gap; and a first means for at least one of forming and re-forming said grooves on said metering roll during operation of said coating system.

2. The coating system of claim 1, wherein said first means comprises a laser beam cutting system.

3. The coating system of claim 1, wherein said first means comprises a mechanical groove forming system.

4. The coating system of claim 3, wherein said first means comprises a thread rolling system.

5. The coating system of claim 1, further comprising a cleaning system operatively associated with said metering roll for cleaning the surface of said metering roll.

6. The coating system of claim 5, wherein said cleaning system is disposed between said metering gap and said first means on a downstream side of said metering gap.

7. The coating system of claim 1, wherein said at least one web support roll comprises two web support rolls defining a squeeze gap therebetween, said material web transferred through said squeeze gap for receiving the coating mixture thereat, and wherein said at least one metering roll comprises two metering rolls operatively associated with each said web support roll, respectively, and further comprising a second means for at least one of forming and reforming said grooves during operation of said coating system, each of said first and second means respectively associated with said two metering rolls.

8. The coating system of claim 7, further comprising means connected to each of said first and second means for controlling movement of said first and second means in a direction substantially parallel to a longitudinal axis of each said metering roll, respectively.

9. The coating system of claim 1, further comprising means for controlling a position of said first means along a longitudinal axis of said metering roll.

* * * * *